July 7, 1942.　　　　C. LUCKHAUPT　　　　2,288,632

METHOD OF TREATING POROUS MATERIALS

Filed March 28, 1938

INVENTOR
Christopher Luckhaupt
BY
HIS ATTORNEY

Patented July 7, 1942

2,288,632

UNITED STATES PATENT OFFICE 2,288,632

METHOD OF TREATING POROUS MATERIALS

Christopher Luckhaupt, Jamaica, N. Y., assignor to Henry J. Lucke, East Orange, N. J.

Application March 28, 1938, Serial No. 198,602

2 Claims. (Cl. 117—142)

This invention relates to a method of treating porous materials and the products resulting therefrom.

More particularly the invention relates to the treatment of porous materials of animal derivation such for example as leather, hair, wool or other fibrous material, animal glues and the like. Such substances are particularly susceptible to the action of terpin hydrate at or above the melting point of terpin hydrate and either terpin hydrate alone or terpin hydrate in connection with fortifiers adapted to impart particular qualities to the material being treated. Such class of substances, if subjected for relatively long periods to the action of melted terpin hydrate, become plastic or otherwise lose their shape, and chemical action between the material being treated and the treating material may take place.

An object of this invention is the method of treatment of porous material of animal derivation to impart thereto, or enhance, the qualities of hardness and correlated attributes as, for example, to increase the tensile, flexural and compressional strengths.

An object of the invention is the treatment of porous material of animal derivation to impart thereto controlled attributes of water, moisture and/or other proofness.

An object of the invention is to control the characteristics of materials of a porous nature and of animal derivation as respects flexibility and the like.

The invention comprises in general the treatment of porous material of animal derivation or kindred matter, and which matter is soluble in terpin hydrate at or about the melting point of terpin hydrate if retained unduly long therein.

Figure 1:
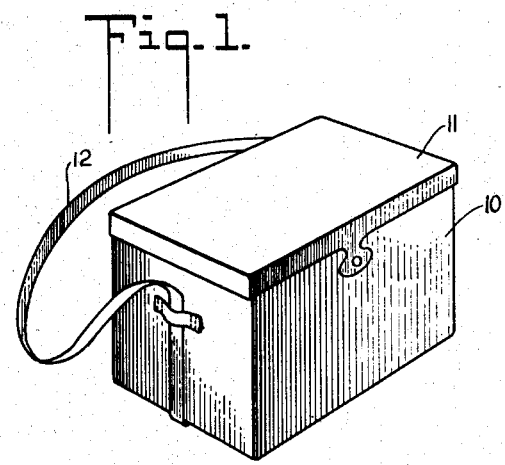
Fig. 1 is a perspective view of an object made from porous material of animal derivation, specifically a bag or case made from leather and which has been treated according to my present invention.
Figure 2:
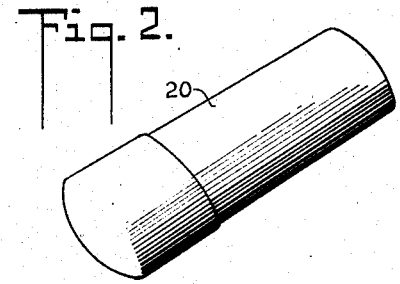
Fig. 2 is a perspective view of a case such as a cigar case made from porous material of animal derivation such, for example, as mohair or wool and which has been treated according to my present invention.
Figure 3:
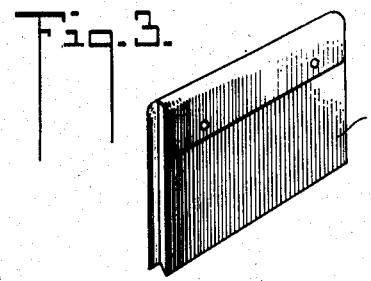
Fig. 3 is a perspective view of a case, specifically a bill fold, made from porous material of animal derivation and treated according to my present invention to control the flexibility and hardness thereof.

Referring to Figs. 1, 2 and 3 of the drawing which illustrate typical products made from porous material of animal derivation such as leather, hair, wool or other fibrous material, the same having been treated to control the characteristics of hardness, flexibility and other desirable characteristics. There is shown in Fig. 1, for example, a case 10 provided with a cover 11 and such case may be made from a porous substance of animal derivation as, for example, leather, leather being desirable for such type of article. Also there is shown a carrying strap 12 which is preferably of leather.

In Fig. 2 is shown in perspective a case 20 made from porous material of animal derivation such as mohair or wool or leather and because of the uses to which it may be put should have certain natural characteristics thereof enhanced or controlled to obtain the best results on resulting articles.

There is shown in Fig. 3 a bill fold or similar article of commerce 21, made from porous material of animal derivation such, for example, as leather and in which it is desirable and necessary to control particularly the characteristics of flexibility which is so desirable in articles of this character.

All of the ordinary porous material of animal derivation such as leather, mohair, wool, animal glues and the like are capable of being dissolved in terpin hydrate and particularly in terpin hydrate at a high degree of temperature particularly such a degree of temperature as is well above the melting point of such terpin hydrate. Therefore the speed of treatment of porous material of animal derivation with terpin hydrate alone or with terpin hydrate in connection with suitable fortifiers is quite rapid and is preferably carried on at a temperature in the neighborhood of the temperature of the melting point of terpin hydrate. As the temperature of the melted terpin hydrate increases, the duration of time of exposure of articles of animal derivation to the treating material is shortened.

Figure 4:
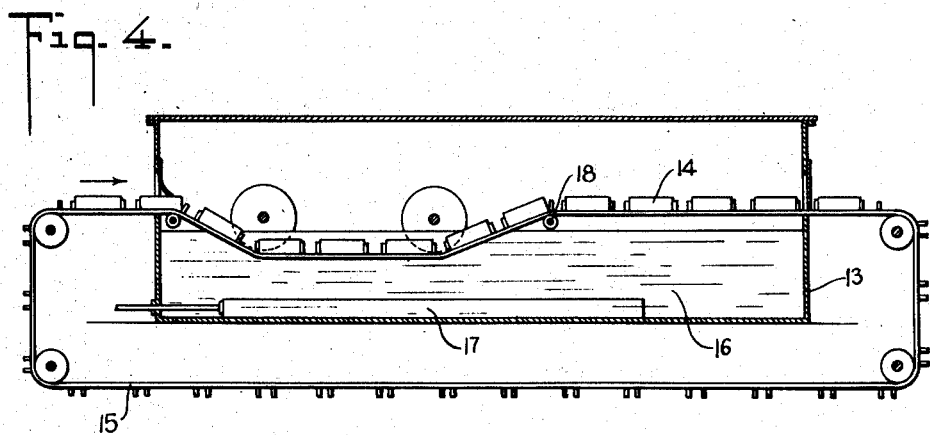
Fig. 4 is a diagrammatic view in elevation indicating certain steps in carrying out my invention by immersing porous objects in treating material.

The treatment material, basically terpin hydrate, is heated to a temperature of from 115° C., and upward in a suitable tank or other container, as the tank 13 in Fig. 4, and the object or objects to be treated, as the objects 14 in Fig. 4 are carried into the container by the endless conveyor 15 and are immersed in the body of terpin hydrate 16, heated to the required temperature by the electrical heating device 17. The treated object is then withdrawn from the terpin hydrate as by the conveyor 15 passing over the roller 18, then passed through an atmosphere of elevated temperature and upon passing outwardly from the tank or container 13 the product 14 is substantially complete.

The time of immersion of the articles 14 which is representative of the articles made from porous material of animal derivation is controlled by the speed of travel of the endless conveyor 15, and the degree of treatment of the articles is controlled by the temperature of the body of melted terpin hydrate 16.

Highly satisfactory results are obtained by immersing the article in a bath of terpin hydrate, $C_6H_8(OH)_2(CH_3)(C_3H_7)+H_2O$, formed by heating terpin hydrate crystals or powder in a suitable container 13 until the terpin hydrate melts, i. e., is dissolved in its own water of crystallization, the temperature of the container 13 being maintained at 115° C., or upward, but preferably because of the character of the material being treated, viz., of animal origin the temperature is maintained as near to 115° C. as is possible. The container 13 is preferably substantially closed relative to the outer atmosphere, suitable provision as the endless conveyor 15 being made for charging the object 14 to be treated into the container 13 for immersion in the bath of melted terpin hydrate 16, the object 14, after immersion in the terpin hydrate being held in an atmosphere of a temperature of at least 115° C. for a relatively short period, usually but a few moments.

If it is desired to color the objects being treated, such coloring material may be added to the melted terpin hydrate 16 and may be in a form such as anilin, vegetable, mineral and/or other dyes, pigments, etc.

By controlling the time and duration of the treatment of the articles illustrated in Figures 1, 2 and 3, and indicated diagrammatically in Fig. 4, the characteristics of the materials, per se are maintained and enhanced. The articles may be made as hard as desired and the flexibility may be controlled to any degree. The outer surface of the articles may have the portion thereof completely filled with the treatment material and made relatively hard so as to place the same in condition for receiving a relatively high polish. Further, by controlling the hardness or stiffness as well as the flexibility, relatively thin material may be utilized to produce the articles shown in the drawing as compared with the thickness of the material required without the use of my invention.

By adding suitable fortifiers such as oleaginous material of the nature of vegetable oils, gums, stearates, waxes such as paraffin, and glycerine, either separately or in various combinations to the melted terpin hydrate 16, the denseness, flexibility, water proofness, resistance to mild acids etc. may be controlled.

The various fortifiers above referred to may be used each singly in combination with the terpin hydrate or equivalent, or may be used in groups in combination with the terpin hydrate to obtain or impart, for example, a plurality of different characteristics to the material being treated. When such various fortifiers are used in combination with the terpin hydrate the proportion thereof, whether singly or in various groups, the relation thereof to the quantity of terpin hydrate used ranges from 2% to 50%.

My invention also relates to the treatment of porous articles of animal derivation by the use of vapors of terpin hydrate either singly or in connection with the vapors of various fortifiers as above referred to, as distinguished from the treatment of such porous materials by immersion in melted terpin hydrate, or by spraying terpin hydrate thereon. For certain articles of animal derivation it is preferred to use the vapor method rather than either the immersion or spraying. This is particularly true of such articles as are readily soluble in terpin hydrate at or above the melting point of terpin hydrate. When the vapor method is employed the terpin hydrate either alone or in connection with fortifiers is heated to about the melting point of terpin hydrate in a closed vessel and the vapors therefrom collect in such closed vessel. The articles to be treated are placed in the closed vessel or are inserted therein in any desired manner and are kept within the closed vessel under the action of the vapor for as long a time as may be necessary to effect the desired result.

Whereas I have described my invention by reference to specific forms thereof, it will be understood that many changes and modifications may be made without departing from the spirit of the invention.

I claim:

1. The method of treating articles made from porous material of animal derivation selected from the group consisting of leather, hair, wool, and glues of animal derivation which are soluble after extended period in terpin hydrate at a temperature at or above the melting point of terpin hydrate to impart thereto enhanced compressional, flexural and tensile strengths, which comprises subjecting the articles to terpin hydrate at a temperature at or above the melting point of terpin hydrate and withdrawing the articles from the terpin hydrate before substantial solution of the material takes place.

2. The method of treating articles made from material of animal derivation selected from the group consisting of leather, hair, wool, and glues of animal derivation which are soluble after extended period in terpin hydrate containing medium at a temperature at or above the melting point of terpin hydrate to impart thereto attributes of water-proofness, water resistance and increased gloss in addition to enhanced compressional, flexual and tensile strengths, which comprises subjecting the articles to a medium containing terpin hydrate admixed with a fortifier imparting in combination with terpin hydrate water-proofness, water resistance and increased gloss selected from the group consisting of vegetable oils, gums, stearates, waxes and glycerine, at a temperature at or above 115° C., the proportion of such fortifier ranging from 2% to 50% by weight relative to terpin hydrate, and withdrawing the articles from the terpin hydrate fortifier medium before substantial solution of the material takes place.

CHRISTOPHER LUCKHAUPT.